No. 776,469. PATENTED NOV. 29, 1904.
R. J. H. HUGHES.
CLIP FOR FASTENING SHOE LACES.
APPLICATION FILED APR. 1, 1904.
NO MODEL.

WITNESSES:
L. Almquist
Sartor Morton

INVENTOR
Robert J. H. Hughes
BY
[signature]
ATTORNEYS

No. 776,469. Patented November 29, 1904.

UNITED STATES PATENT OFFICE.

ROBERT JOSEPH HORACE HUGHES, OF DUQUESNE, PENNSYLVANIA.

CLIP FOR FASTENING SHOE-LACES.

SPECIFICATION forming part of Letters Patent No. 776,469, dated November 29, 1904.

Application filed April 1, 1904. Serial No. 201,074. (No model.)

*To all whom it may concern:*

Be it known that I, ROBERT JOSEPH HORACE HUGHES, a citizen of the United States, and a resident of Duquesne, in the county of Allegheny and State of Pennsylvania, have invented a new and Improved Clip for Fastening Shoe-Laces, of which the following is a full, clear, and exact description.

This invention relates to clips for clamping shoe-laces; but it may be employed without modification for fastening other cords, if desired.

The general object of the invention is to provide a simple, durable, and inexpensive clip which may be quickly applied to shoe-laces, which will hold the laces with perfect security, so doing away with the necessity of tying them in a knot in the ordinary manner, and which may be easily loosened to permit the unlacing of the shoes when desired.

A further object of the invention is to provide a device of the character specified which may be readily applied to any ordinary shoe-laces or other cords of suitable dimensions and which when in use will lie close to the user's ankle and will not cause the user any discomfort from pressure against the ankle.

With the objects above stated and others in view, as will hereinafter appear, the invention consists in the novel construction, combination, and arrangement of parts of a clip for fastening shoe-laces, hereinafter described and having the novel features thereof particularly pointed out in the appended claims.

Reference is to be had to the accompanying drawings, forming a part of this specification, in which similar characters of reference indicate corresponding parts in all the views.

Figure 1:
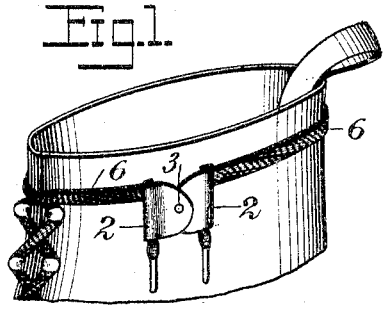
Figure 2:
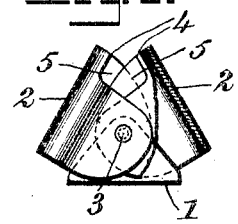
Figure 3:
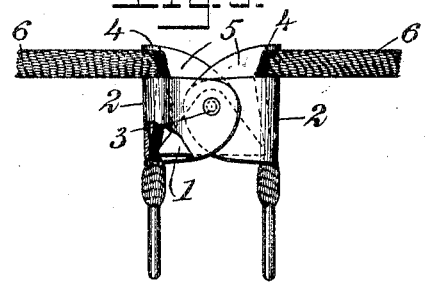
Figure 6:
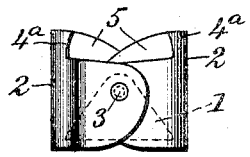
Figure 7:
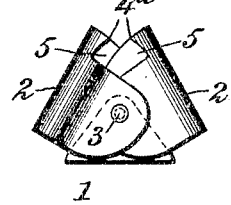
Figure 4:
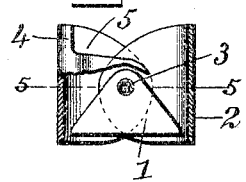
Figure 5:
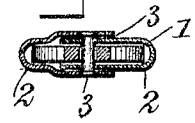

Figure 1 is a perspective view of the top of a laced shoe, showing the clip in operative relation to the shoe-laces. Fig. 2 is an elevational view of the clip in inoperative position with a portion of one jaw broken away to show the inner structure of the clip. Fig. 3 is an elevational view of the clip in operative position, the view being taken from the side of the clip which lies in contact with the shoe. Fig. 4 is a view, principally in section, of the clip with the parts thereof in operative position, but with the laces removed. Fig. 5 is a sectional view upon the line 5 5 of Fig. 4. Fig. 6 is a view of another form of clip in closed position, and Fig. 7 is a view of the clip shown in Fig. 6 in open position.

Referring to the drawings, 1 designates a block, preferably of substantially triangular form, though any other form of block presenting a base of suitable dimensions and an apex above the middle of the base may be employed. The block 1 has pivotally mounted thereon a pair of jaws 2 2, formed, preferably, of sheet metal and secured by a pivot 3, extending through the jaws and through the block 1 near the apex of the block, as shown. The jaws 2 2 are both formed by bending blanks of sheet metal of suitable dimensions so that the jaws may receive the block 1 and overlap each other sufficiently to permit a single pivot to serve as a connection between both jaws and the block. Each of the jaws 2 is preferably cut away upon its inner face at the upper edge to form a shoulder 4 and provide a recess 5 for the passage of one of the shoe-laces 6.

The mode of applying the clip to the shoe-laces is clearly shown in the drawings. The parts of the clip are brought into the position shown in Fig. 2 by applying pressure with the thumb and finger to the two jaws 2 2 near their upper edges. The lower edges of the jaws are so moved away from the extremities of the base of the block 1, and unobstructed passages are provided for the laces, which are then passed downward between the jaws and the extremities of the base of the block 1, each lace being brought down into one of the recesses 5. As the laces are drawn taut the strain exerted thereon reacts against the two jaws 2 2 of the clip and causes the jaws to turn upon the pivot 3 from the position shown in Fig. 2 to that shown in Fig. 3, in which the laces are shown as clamped between the jaws and the extremities of the base of the block 1.

The recesses 5 are provided for a twofold purpose—viz., to insure the contact of the clip with the shoe-upper, as shown in Fig. 1, and to bring the laces between the upper part of the clip and the shoe, so providing a slight cushion between the shoe-upper and the metal of the clip. The recesses 5 are advantageous also in preventing contact of the laces with the wearer's other garments to a slight extent.

After the device has been applied to the laces and the jaws have been brought into clamping engagement with the laces the tension of the laces themselves is sufficient to keep the jaws in such engagement and prevent any accidental loosening of the clip. When, however, it is desired to tighten either of the laces, a slight pressure against the upper part of the jaw engaging the lace to be tightened will loosen the grip of the jaw upon the lace, so that the lace may be easily drawn downward through the clip until the required tension is obtained. In like manner if it is desired to adjust the position of the clip with reference to the shoe both the jaws may be pressed into inoperative position, and the clip may be adjusted by drawing one of the laces downward through the clip, while the other is allowed to pass upward through it.

A special feature of advantage in the clip forming the present invention is its adaptability to the laces of ordinary shoes without the necessity of permanently securing the clip upon the shoe, which is undesirable because of the injury to the shoe which always results from the attachment of the clip and because if the clip is attached to the shoe the strains imposed thereon by the laces are very apt to pull the clip loose and possibly to tear the shoe in so doing. By having the clip entirely detached from the shoe, but so constructed that it lies perfectly flat against the upper, as shown in Fig. 1, the pull upon the two laces is always equalized by the clip, and it automatically adjusts itself in position as the tension upon the laces varies.

In Figs. 6 and 7 I have illustrated a slightly-different form of clip constructed in accord with this invention. In this form of clip the jaw members 2 2 are provided with slightly-curved shoulders 4$^a$ at the sides of the recesses 5, and owing to the concave curvature of the shoulders 4$^a$ the shoe-laces or other cords are held somewhat more firmly than by means of a clip formed with straight shoulders, as described in the foregoing paragraphs and illustrated in Figs. 1 to 4, inclusive.

Having thus described my invention, I claim as new and desire to secure by Letters Patent—

1. A clip for fastening shoe-laces and the like, comprising a block of substantially triangular form, and a pair of jaws pivotally mounted near the apex of the block and having their lower edges extended downward opposite the extremities of the base of the block.

2. A clip for fastening shoe-laces and the like, comprising a substantially triangular block, and a pair of jaws mounted upon a pivot extending through the block near its apex, said jaws being extended downward as far as the base of the block and being extended upward above the apex of the block.

3. A clip for fastening shoe-laces and the like, comprising a substantially triangular block, and a pair of jaws pivotally mounted thereon and extending downward opposite the extremities of the base of said block, each of said jaws being provided upon its inner face with a recess to receive a shoe-lace.

4. A clip for fastening-shoe laces, comprising a substantially triangular block, and a pair of jaws bent around the said block, overlapped upon opposite faces of the block, and pivotally secured thereon by means of a pivot passing through the overlapped portions of the jaws and through the block near its apex, said jaws being extended downward opposite the extremities of the base of the block, and being extended upward above its apex.

In testimony whereof I have signed my name to this specification in the presence of two subscribing witnesses.

ROBERT JOSEPH HORACE HUGHES.

Witnesses:
Wm. Milroy,
Mollie Herbert